(12) United States Patent
Matsumoto et al.

(10) Patent No.: US 8,315,073 B2
(45) Date of Patent: Nov. 20, 2012

(54) ISOLATED SWITCHING POWER SUPPLY DEVICE

(75) Inventors: Tadahiko Matsumoto, Otsu (JP); Eito Moromizato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 571 days.

(21) Appl. No.: 12/551,585

(22) Filed: Sep. 1, 2009

(65) Prior Publication Data

US 2010/0188872 A1 Jul. 29, 2010

(30) Foreign Application Priority Data

Jan. 27, 2009 (JP) ................................. 2009-015043

(51) Int. Cl.
*H02M 3/335* (2006.01)
(52) U.S. Cl. .................................................. 363/21.06
(58) Field of Classification Search .................... 363/15, 363/17, 21.04, 21.06, 21.07, 21.1, 21.11, 363/21.15
See application file for complete search history.

(56) References Cited

U.S. PATENT DOCUMENTS

| | | | |
|---|---|---|---|
| 4,814,962 A | 3/1989 | Magalhaes et al. | |
| 6,061,254 A | 5/2000 | Takegami | |
| 6,281,779 B1 | 8/2001 | Matsumoto et al. | |
| 7,254,046 B2 * | 8/2007 | Kawasaki et al. | 363/21.12 |
| 7,630,217 B2 * | 12/2009 | Moromizato | 363/21.06 |
| 2006/0139823 A1 | 6/2006 | Shoji et al. | |
| 2009/0161391 A1 | 6/2009 | Matsumoto | |

FOREIGN PATENT DOCUMENTS

| | | |
|---|---|---|
| EP | 1 202 442 A2 | 5/2002 |
| JP | 2-13262 A | 1/1990 |
| JP | 7-337012 A | 12/1995 |
| JP | 2000-260639 A | 9/2000 |
| JP | 2003-033016 A | 1/2003 |
| JP | 2003-79149 A | 3/2003 |
| JP | 2006-187147 A | 7/2006 |
| JP | 2006-270976 A | 10/2006 |
| JP | 2008-79488 A | 4/2008 |
| JP | 2008-160903 A | 7/2008 |
| WO | 2008/041399 A1 | 4/2008 |

OTHER PUBLICATIONS

Official Communication issued in corresponding Japanese Patent Application No. 2009-015043, mailed on Apr. 19, 2011.
Official Communication issued in corresponding European Patent Application No. 10150935.4, mailed on Aug. 6, 2010.
Lee et al., "Analysis and Design of Asymmetrical ZVS PWM Half Bridge Forward Converter with Flyback Type Transformer", 35th Annual IEEE Power Electronics Specialists Conference, Jun. 20, 2004, pp. 1525-1530.

(Continued)

*Primary Examiner* — Adolf Berhane
*Assistant Examiner* — Yemane Mehari
(74) *Attorney, Agent, or Firm* — Keating & Bennett, LLP

(57) ABSTRACT

An isolated switching power supply device includes a main transformer having a primary coil on a primary circuit side and a secondary coil on a secondary circuit side. On the primary circuit side are disposed an input smoothing capacitor, a switching control circuit, a high-side driver, a low-side power switch, a high-side power switch, capacitors, and edge signal-generating circuits. A symmetrical control half bridge converter is thus provided. The secondary circuit side has a voltage clamping circuit including a clamp capacitor, a clamp switch and a diode.

9 Claims, 13 Drawing Sheets

OTHER PUBLICATIONS

Liang et al., "Design Optimization for Asymmetrical Half-Bridge Converters", 16th Annual IEEE Applied Power Electronics Conference and Exposition, Mar. 4-8, 2001, vol. 2, pp. 697-699.

Korotkov et al., "Small-Signal Modeling of Soft-Switched Asymmetrical Half-Bridge DC/DC Converter", Applied Power Electronics Conference and Exposition, Mar. 5-9, 1995, pp. 707-711.

Official Communication issued in corresponding European Patent Application No. 10150935.4, mailed on Jun. 8, 2010.

Li et al., "Common-Mode Noise Reduction in DC-DC Converters by Common-Source Type Active-Clamp Technique," 32nd Annual IEEE Power Electronics Specialists Conference, vol. 4, Jun. 17, 2001, Vancouver Canada, pp. 1773-1778.

Shoyama et al., "Application of Common-Source Active-Clamp Cincuit to Various DC-DC Converter Topologies," 34th Annual IEEE Power Electronics Specialists Conference, vol. 3, Jun. 15, 2003, Acapulco Mexico, pp. 1321-1326.

* cited by examiner

ISOLATED SWITCHING POWER SUPPLY DEVICE

BACKGROUND OF THE INVENTION

1. Field of the Invention

The present invention relates to an isolated switching power supply device that includes a main transformer arranged to transmit power from a primary side to a secondary side, and a power switch arranged to switch the current flowing to a primary coil of the main transformer from a DC input power supply, and outputs a desired direct voltage or direct current.

2. Description of the Related Art

The efficiency of a circuit can be increased by reducing the switching loss, and the switching loss can be reduced by zero voltage switching (ZVS). For example, an isolated switching power supply device including a voltage clamping circuit may be used as disclosed in Japanese Unexamined Patent Application Publication No. 2003-33016.

Such an isolated switching power supply device including a voltage clamping circuit is often used in the case where the output voltage is lower than the input voltage. FIG. 1 shows a known isolated switching power supply device. FIG. 2 shows waveform charts of some portions of the switching power supply device.

As shown in FIG. 1, the main transformer T1 includes a primary coil n1 and a secondary coil n2. On the primary side are disposed a voltage clamping circuit 2 defined by connecting a series circuit including a clamp capacitor C1 and a clamp switch Q2 to a primary coil n1 in series. The clamp switch Q2 is a p-type channel MOSFET (Metal-Oxide-Semiconductor Field-Effect Transistor), and has a parasitic diode in parallel. A switching control circuit 1 is a PWM (pulse width modulation) control IC that drives an active clamp converter. The switching control circuit 1 includes a power switch driving terminal outA, a clamp switch driving terminal outB, a feedback signal input terminal COMP and a ground terminal GND. The clamp switch driving terminal outB is connected to a level shift circuit including a diode D11 and a capacitor C10. The feedback signal input terminal COMP is connected to the light-receiving transistor of a photo coupler PC1.

The secondary side of the main transformer T1 includes synchronous rectifying devices Q3 and Q4, a choke coil L1, an output smoothing capacitor C3, resistors R2, R3 and R4, the ELD of the photo coupler PC1, and a shunt regulator SRG1.

The DC voltage applied between the terminals +Vin and −Vin of a DC input power supply is smoothed by an input smoothing capacitor C2, subsequently converted into an AC voltage by switching of a power switch Q1, and then transmitted from the primary coil n1 of the main transformer T1 to the secondary coil n2. The AC voltage is rectified by a rectifier circuit including a rectifying side switching device Q3 and a commutation side switching device Q4 and is then smoothed through a choke coil L1 and an output smoothing capacitor C3, thereby being converted into a DC voltage. An isolated switching power supply device having the above structure acts as an active clamp forward converter.

Driving signals are outputted from the terminals outA and outB of the switching control circuit 1. The output signal from the terminal outB is at the high (H) level over the period for which the output signal from the terminal outA is at the H level, and the H level period of the signal from the terminal outB starts earlier and ends later, thus being longer than that of the signal from the terminal outA. The output from the terminal outA is directly applied between the gate (G) and the source (S) of the n-type channel MOSFET or power switch Q1, and the output from the terminal outB is applied between the source (S) and the gate (G) of the p-type channel MOSFET or clamp switch Q2 through the level shift circuit including the capacitor C10 and the diode D11. Consequently, the power switch Q1 and the clamp switch Q2 are driven with complementary timing with dead time periods (t1 to t3 and t4 to t0 in FIG. 2) for which both switches are off. More specifically, PWM control is performed such that when the pulse width of the power switch Q1 is increased, the pulse width of the clamp switch Q2 is reduced, and when the pulse width of the power switch Q1 is reduced, the pulse width of the clamp switch Q2 is increased.

On the secondary side, the output voltage is divided by the resistors R3 and R4, and the divided voltages are input to the reference terminal of the shunt regulator SRG1. If the divided voltage increases beyond a specified value, the cathode current of the shunt regulator SRG1 is increased through the resistor R2 and the LED of the photo coupler PC1, and thus the current of the light-receiving transistor of the photo coupler PC1 is increased on the primary side. When the light-receiving transistor of the photo coupler PC1 is brought into conduction, the potential of the feedback signal input terminal COMP of the switching control circuit 1 is reduced to reduce the duty D of the power switch Q1. The output voltage Vout and the input voltage Vin of the forward converter, the turns ratio n2/n1 of the main transformer T1, and the duty D of the power switch Q1 have the following relationship:

$$Vout=(n2/n1)\cdot D\cdot Vin$$

Hence, the output voltage is reduced by reducing the duty D. In contrast, if the divided voltage of the output voltage becomes lower than the specified value, the cathode current of the shunt regulator SRG1 running through the light-receiving transistor of the photo coupler PC1 is reduced to reduce the current flowing into the light-receiving transistor, and the potential of the feedback signal input terminal COMP of the switching control circuit 1 is increased to increase the duty D of the power switch Q1. The increase of the duty D increases the output voltage. Thus, the PWM control is performed so that the output voltage becomes constant.

As shown in FIG. 2, when the output of the terminal outA changes to the high (H) level from the low (L) level at time t0, the power switch Q1 is turned on and a current substantially proportional to the current of the choke coil L1 flows to the power switch Q1. When the power switch Q1 is turned off at time t1 and the voltage between the drain and the source of the power switch Q1 (Q1 D-S voltage) increases beyond the input voltage, LC resonance occurs between the excitation inductance of the transformer T1 and the parasitic capacitance present parallel to the D-S portion of the power switch Q1 (between times t1 and t2). If the D-S voltage of the power switch Q1 increases beyond the voltage between the ends of the clamp capacitor C1 at time t2, the parasitic diode of the clamp switch Q2 is brought into conduction and LC resonance occurs between the excitation inductance of the transformer T1 and the capacitance of the clamp capacitor C1. Since the capacitance of the clamp capacitor C1 is higher than the parasitic capacitance parallel to the D-S portion of the power switch Q1, the changes in the D-S voltage of the power switch Q1 become small and the waveform becomes such that the D-S voltage is clamped to substantially a constant value.

When the clamp switch Q2 is turned on at time t3 in the period for which the parasitic diode is in conduction, the LC resonance between the excitation inductance of the transformer T1 and the capacitance of the clamp capacitor C1 extends to reverse the direction of the exciting current. When the clamp switch Q2 is turned off at time t4 in the period for which an exciting current flows from the clamp capacitor C1 to the primary coil n1 of the transformer T1, the capacitance of the clamp capacitor C1 is removed from the circuit in which the LC resonance occurs, the resonance capacitance becomes the parasitic capacitance parallel to the D-S portion of the power switch Q1 again. Consequently, the resonance capacitance is reduced to reduce the D-S voltage of the power switch Q1 rapidly. Then, the power switch Q1 is turned on again at time t0 in the following cycle.

Surge voltage between both ends of the power switch Q1 is prevented by a clamping operation, and accordingly, a low-withstand-voltage transistor can be used as the power switch Q1. In addition, the electromagnetic energy of the transformer T1 absorbed by the clamp capacitor C1 can be regenerated by the LC resonance operation, and thus, highly efficient characteristics can be achieved.

In the switching power supply shown in FIG. 1, a direct current of about 10 V occurs between the ground terminal GND of the switching control circuit 1 and the source terminal or reference terminal of the clamp switch Q2. A clamp switch driving circuit can be composed of the level shift circuit including the capacitor C10 and the diode D11.

FIG. 3 shows another known isolated switching power supply device. FIG. 4 shows waveform charts of some portions of the switching power supply device.

The isolated switching power supply device shown in FIG. 3 is different from that shown in FIG. 1 in that the voltage clamping circuit 2 is disposed in a different position and a drive transformer T4 is used. Also, the clamp switch is not a p-type, but an n-type channel MOSFET. The other structure is substantially the same as that shown in FIG. 1. Driving signals outputted from the terminals outA and outB of the switching control circuit 1 come into the H level with complementary timing with dead time periods for which both signals are at the L level (time t1 to t3 and t4 to t0 in FIG. 4). Accordingly, the power switch Q1 and the clamp switch Q2 are driven with complementary timing with dead time periods. The operation of the voltage clamping circuit 2 shown in FIG. 3 is the same as the operation of the voltage clamping circuit 2 shown in FIG. 1. The potential of the source terminal of the clamp switch Q2 with respect to the ground terminal GND of the switching control circuit 1 is varied in an alternating manner by the switching operation of the power switch Q1. Accordingly, the output voltage from the clamp switch driving terminal outB is transmitted through the drive transformer T4, and thus a driving signal is applied between the gate and the source of the clamp switch Q2 through the level shift circuit including the diode D11 and the capacitor C10.

If a high input voltage is applied to a converter, it is required that the voltage clamping circuit 2, which is a series circuit of the clamp switch Q2 and the capacitor C1, be connected to the power switch Q1 in parallel, as shown in FIG. 1, so as to directly drive the clamp switch Q2 with an output signal from the switching control circuit 1. Accordingly, a p-type channel FET is inevitably used as the clamp switch Q2.

However, the p-type channel FET has a high on-resistance, and the product of the on-resistance and the input capacitance is about three times as high as that of an n-type channel MOSFET. Thus, the switching loss of the p-type channel FET is undesirably larger than that of the n-type channel FET. Therefore, isolated switching power supply devices including a p-type channel FET as the clamp switch Q2 are not suitable for application requiring relatively high power.

In order to use an n-type channel FET as the clamp switch, however, the voltage clamping circuit 2, which is a series circuit of the clamp switch Q2 and the clamp capacitor C1, is connected to the primary coil n1 of the main transformer T1 in parallel, as shown in FIG. 3. Consequently, the clamp switch Q2 cannot be directly driven by the output signal from the switching control circuit 1, and a drive transformer T4 is necessary.

On the other hand, in order to transmit square waves of switching frequency at a low loss, the drive transformer T4 requires a relatively high excitation inductance (for example, 100 μH or more). Accordingly, the number of turns of the primary coil and the secondary coil of the drive transformer T4 must be increased. This results in a high-cost and a large-size device.

If in order to reduce the surge voltage of the power switch Q1, a voltage clamping circuit is disposed on the secondary side of the main transformer T1 so that the voltage clamping circuit can be driven from the primary side through a drive transformer, it is required that the drive transformer have a withstand voltage (for example, 1500 V DC) satisfying safety standards. This undesirably results in a larger size and a higher cost.

SUMMARY OF THE INVENTION

Accordingly, preferred embodiments of the present invention provide an isolated switching power supply device not using a transformer having a high inductance, such as a drive transformer, in spite of the use of n-type channel MOSFET as a clamp switch, but using a pulse transformer that can transmit at least a pulse edge signal to transmit the turn-on/turn-off timing for driving the clamp switch, thereby achieving zero voltage switching.

According to a preferred embodiment of the present invention, the isolated switching power supply device has the following configuration. The isolated switching power supply device includes a main transformer including a primary coil provided on a primary circuit side of the switching power supply device and a secondary coil provided on a secondary circuit side so as to transmit power from the primary circuit side to the secondary circuit side. At least one power switch is connected to the primary coil of the main transformer in series. The power switch switches a current flowing to the primary coil of the main transformer from a DC input power supply. A rectifier circuit rectifies the voltage generated in the secondary coil of the main transformer. A smoothing circuit smooths the voltage rectified by the rectifier circuit. A voltage clamping circuit includes a clamp switch. The voltage clamping circuit absorbs surge voltage generated when the voltage applied to the main transformer is reversed, and thus clamps the voltage applied to the main transformer to a predetermined upper limit value. A switching control circuit includes a first output terminal outputting a signal arranged to drive the power switch and a second output terminal arranged to output a signal so as to drive the clamp switch. A first pulse transformer includes a primary coil connected to the second output terminal and a secondary coil. The first pulse transformer transmits an edge signal of a pulsed signal to drive the clamp switch. A clamp switch driving circuit is connected to the secondary coil of the first pulse transformer and generates a clamp switch driving signal using the edge of the signal to drive the clamp switch outputted from the first pulse transformer as a trigger. The clamp switch driving signal controls the on/off states of the clamp switch.

The voltage clamping circuit and the clamp switch driving circuit may be disposed on the primary circuit side.

The voltage clamping circuit and the clamp switch driving circuit may be disposed on the secondary circuit side.

The main transformer, the power switch and the clamp switch may define a half bridge circuit with a clamp capacitor. In this instance, the power switch and the clamp switch are connected to the DC input power supply in series. The primary coil of the main transformer and the clamp capacitor define a series circuit connected to a contact point between one end of the power switch and the voltage clamping circuit.

The main transformer and the first pulse transformer may be defined by a multiple transformer. The multiple transformer includes a core having a center leg and at least one pair of outer legs opposing each other with the center leg therebetween. At least one of the pair of the outer legs is divided into two portions by a space allowing coils to be formed. The core thus defines a closed magnetic circuit. The multiple transformer also includes a first coil set including at least two coils wound around the center leg of the core, and a second coil set including at least two coils, each wound around the divided portions of the outer leg in the opposite directions.

The rectifier circuit may be a synchronous rectifier circuit including a first semiconductor switch element and a second semiconductor switch element.

The isolated switching power supply device may further include a synchronous rectifying device-driving circuit that controls the on/off operation of the first and second semiconductor switch elements of the synchronous rectifier circuit, and a second pulse transformer and a third pulse transformer, each including a primary coil and a secondary coil and transmitting an edge signal of pulse waves. The primary coil of the second pulse transformer is connected to the second output terminal of the switching control circuit, and the secondary coil of the second pulse transformer is connected to the synchronous rectifying device-driving circuit so as to control one of the first and second semiconductor switches of the synchronous rectifier circuit. The primary coil of the third pulse transformer is connected to the first output terminal of the switching control circuit, and the secondary coil of the third pulse transformer is connected to the synchronous rectifying device-driving circuit so as to control the other semiconductor switch.

The voltage clamping circuit and the clamp switch driving circuit may be disposed on the secondary circuit side. The primary coil of the first pulse transformer and the primary coil of the second pulse transformer include a common winding, and the first pulse transformer and the second pulse transformer are defined by a pulse transformer including a single closed magnetic circuit.

The main transformer and the first to third pulse transformers may be defined by a multiple transformer. The multiple transformer includes a core having a center leg and at least one pair of outer legs opposing each other with the center leg therebetween. At least one of the pair of the outer legs is divided into two portions by a space allowing coils to be formed. The core thus defines a closed magnetic circuit. The multiple transformer also includes a first coil set including at least two coils wound around the center leg of the core, and a second coil set including at least two coils, each wound around the divided portions of the outer leg in the opposite directions.

The above preferred embodiments of the present invention can achieve an isolated switching power supply device exhibiting high circuit efficiency and high power capacity. In the configurations according to the preferred embodiments, a low-withstand-voltage transistor can be used, and consequently, the size and the cost of the resulting device can be reduced. Furthermore, by using a multiple transformer as the main transformer and the pulse transformer, cost increase can be prevented.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

Figure 5:
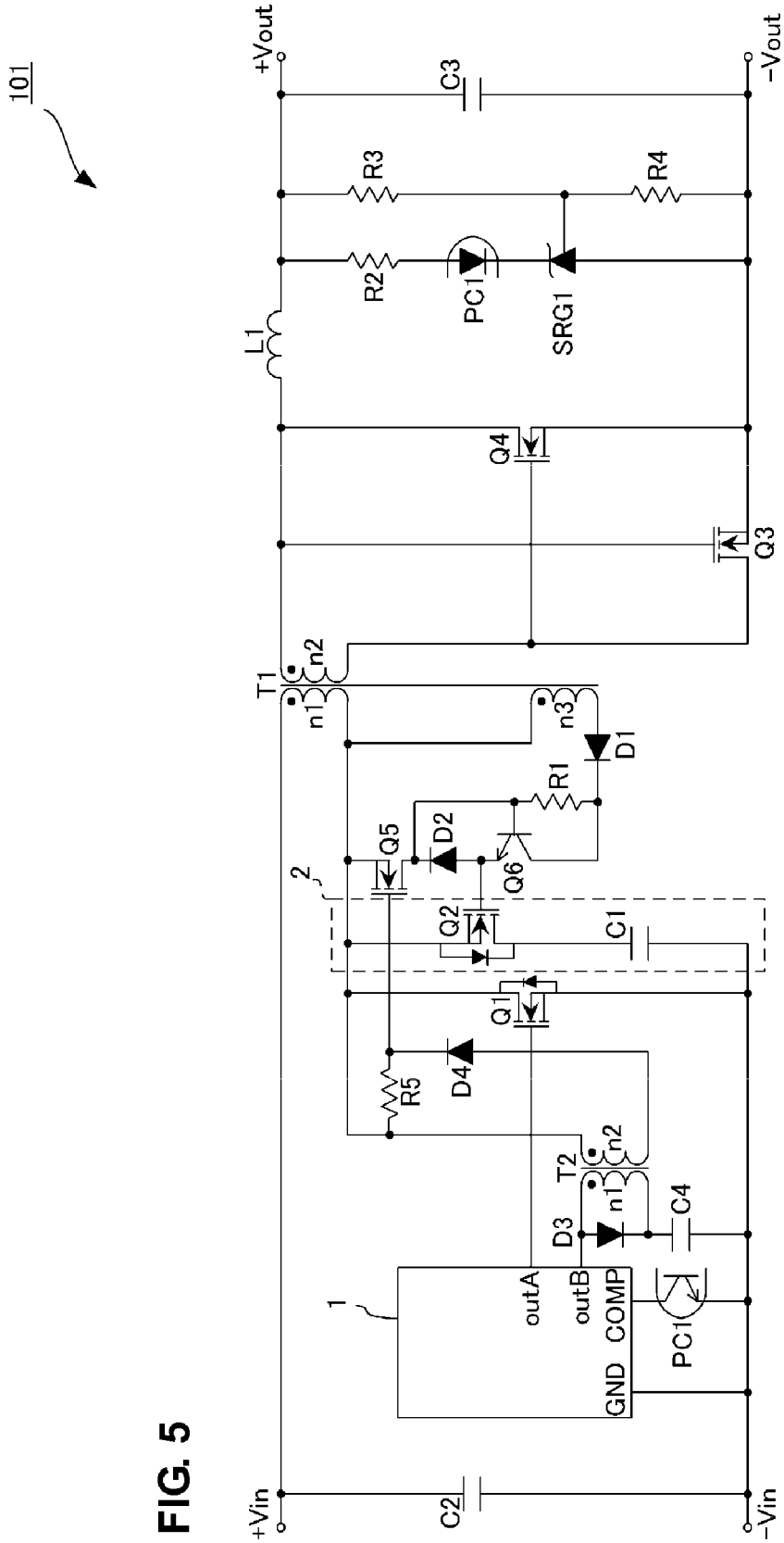
FIG. 5 is a circuit diagram of an isolated switching power supply device 101 according to a first preferred embodiment of the present invention.
Figure 6:
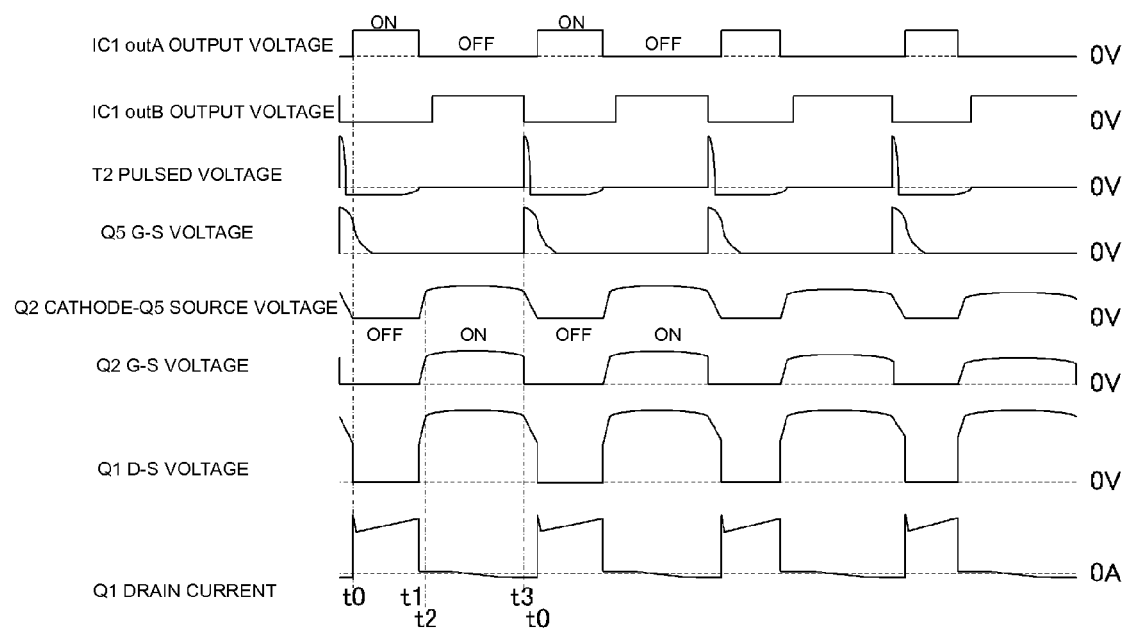
FIG. 6 is a representation of waveform charts of some portions of the isolated switching power supply device 101 shown in FIG. 5.

FIG. 5 is a circuit diagram of an isolated switching power supply device 101 according to a first preferred embodiment of the present invention. FIG. 6 shows waveforms of some portions of the isolated switching power supply device 101, and FIGS. 7A-7D show the structure of a multiple transformer used in the isolated switching power supply device 101.

In FIG. 5, the isolated switching power supply 101 includes a main transformer T1. A series circuit including a clamp capacitor C1 and a clamp switch Q2 is connected to the primary coil n1 of the main transformer T in series to define a voltage clamping circuit 2. The clamp switch Q2 preferably is an n-type channel MOSFET, and has a parasitic diode in parallel. A switching control circuit 1 is a PWM (pulse width modulation) control IC that drives the active clamp converter or the isolated power supply device 101. The switching control circuit 1 includes a power switch driving terminal outA, a clamp switch driving terminal outB, a feedback signal input terminal COMP and a ground terminal GND. A clamp switch driving circuit is a circuit connected to the voltage clamping circuit 2 and arranged to apply a control signal to the clamp switch Q2.

A pulse transformer T2 includes a primary coil n1 and a secondary coil n2. A switch element Q5 is defined by an n-type channel MOSFET, and a switch element Q6 is defined by an npn transistor.

On the secondary side of the main transformer T1 are disposed synchronous rectifying devices Q3 and Q4, a choke coil L1, an output smoothing capacitor C3, resistors R2, R3 and R4, an ELD of the photo coupler PC1, and a shunt regulator SRG1.

The direct voltage applied between the terminals +Vin and −Vin of a DC input power supply is smoothed by an input smoothing capacitor C2, subsequently converted into an AC voltage by switching of a power switch Q1, and then transmitted from the primary coil n1 of the main transformer T1 to the secondary coil n2. The AC voltage is rectified by a rectifier circuit including a rectifying side switching device Q3 and a commutation side switching device Q4, and is then converted into a DC voltage by being smoothed through a choke coil L1 and an output smoothing capacitor C3. The isolated switching power supply device having the above structure acts as an active clamp forward converter.

Driving signals are outputted from the terminals outA and outB of the switching control circuit 1, and come into the H level with complementary timing with dead time periods for which both signals are at the L level. Thus, the power switch Q1 directly driven by the switching control circuit 1 and the clamp switch Q2 driven through the pulse transformer T2 are driven with complementary timing with dead time periods.

On the secondary side, the output voltage is divided by the resistors R3 and R4, and the divided voltages are input to the reference terminal of the shunt regulator SRG1. If the divided voltage increases beyond a specified value, the cathode current of the shunt regulator SRG1 is increased through the resistor R2 and the LED of the photo coupler PC1, and thus the current of the light-receiving transistor of the photo coupler PC1 is increased in the primary circuit. When the light-receiving transistor of the photo coupler PC1 is brought into conduction, the potential of the feedback signal input terminal COMP of the switching control circuit 1 is reduced to reduce the duty D of the power switch Q1. The output voltage Vout and the input voltage Vin of the forward converter, the turns ratio n2/n1 of the main transformer T1, and the duty D of the power switch Q1 have the following relationship:

$$Vout = (n2/n1) \cdot D \cdot Vin$$

Hence, the output voltage is reduced by reducing the duty D. In contrast, if the divided voltage of the output voltage becomes lower than the specified value, the cathode current of shunt regulator SRG1 running through the light-receiving transistor of the photo coupler PC1 is reduced to reduce the current flowing into the light-receiving transistor of the photo coupler PC1. Thus, the potential of the feedback signal input terminal COMP of the switching control circuit 1 is increased to increase the duty D of the power switch Q1. The increase of the duty D increases the output voltage. Thus, the PWM control is performed so that the output voltage becomes constant.

As shown in FIG. 6, when the output of the terminal outA changes to the H level from the L level at time t0, the power switch Q1 is turned on and a current substantially proportional to the current of the choke coil L1 flows to the power switch Q1. When the power switch Q1 is turned off at time t1 and the D-S voltage of the power switch Q1 increases beyond the input voltage, LC resonance occurs between the excitation inductance of the main transformer T1 and the parasitic capacitance present parallel to the D-S portion of the power switch Q1 (between times t1 and t2). If the D-S voltage of the power switch Q1 increases beyond the voltage between the ends of the clamp capacitor C1 at time t2, the parasitic diode of the clamp switch Q2 is brought into conduction and LC resonance occurs between the excitation inductance of the transformer T1 and the capacitance of the clamp capacitor C1. Since the capacitance of the clamp capacitor C1 is higher than the parasitic capacitance parallel to the D-S portion of the power switch Q1, the changes of the D-S voltage of the power switch Q1 becomes small and the waveform of the D-S voltage is clamped to substantially a constant value.

The main transformer T1 also has a tertiary coil n3. When the diode D1 is turned on by a voltage generated in the tertiary coil n3, a current flows to the base of a switch element Q6 through a resistor R1 to turn on the switch element Q6. Thus, the base of the clamp switch Q2 is charged to turn on the clamp switch Q2.

Although the output voltage from the terminal outB of the switching control circuit 1 is then reversed to the H lever from the L level, pulsed voltage (edge signal) is not generated in the secondary coil n2 of the pulse transformer T2 at this timing, because the current charging the capacitor C4 flows through the diode D3, but not through the primary coil n1 of the pulse transformer T2.

Then, the LC resonance between the excitation inductance of the main transformer T1 and the capacitance of the clamp capacitor C1 extends to reverse the direction of the exciting current. When the output voltage from the terminal outB of the switching control circuit 1 is reversed to the L level from the H level at t3 in the period for which an exciting current flows from the clamp capacitor C1 to the primary coil n1 of main transformer T, the charge stored in the capacitor C4 is discharged to the terminal outB through the primary coil n1 of the pulse transformer T2. Consequently, a pulsed voltage (edge signal) is generated in the secondary coil n2 of the pulse transformer T2. The pulsed voltage electrifies the diode D4 to turn on the switch element Q5. The diode D4, the resistor R5 and the input capacitor of the switch element Q5 constitute a circuit for extending the pulse width.

Even if the pulsed voltage of the secondary coil n2 of the pulse transformer T2 disappears, the G-S voltage of the switch element Q5 is reduced according to the time constant of the input capacitances of the resistor R5 and the switch element Q5. Accordingly, the pulse width of the pulsed signal is expanded to extend the period of the on state of the switch element Q5 sufficiently, as shown in (d) of FIG. 6. When the switch element Q5 turns on, the base voltage of the switch element Q6 is reduced to turn off the switch element Q6 and also the clamp switch Q2. When the clamp switch Q2 is turned off, the capacitance of the clamp capacitor C1 is removed from the circuit in which the LC resonance occurs, and the resonance capacitance becomes a parasitic capacitance parallel to the D-S portion of the power switch Q1 again. Consequently, the resonance capacitance is reduced to reduce the D-S voltage of the power switch Q1 rapidly. Then, the power switch Q1 is turned on again at time t0 in the following cycle. One cycle is thus completed.

The cycle above is repeated.

Surge voltage applied between both ends of the power switch Q1 is prevented by a clamping operation. Accordingly, a low-withstand-voltage transistor can be used as the power switch Q1, and the electromagnetic energy of the transformer T1 absorbed by the clamp capacitor C1 can be regenerated by the LC resonance operation. Thus, high-efficient converter operation can be achieved. In addition, zero voltage switching by the clamp switch Q2 is effective in enhancing the efficiency and reducing noises.

The isolated switching power supply device according to the first preferred embodiment uses an n-type channel FET, but does not require a transformer having a high excitation inductance such as a drive transformer. The clamp circuit can be operated by transmitting a turn-on/turn-off timing with a pulse transformer that can transmit at least a pulse edge signal, thereby achieving zero voltage switching.

A multiple transformer functioning as the main transformer T1 and the pulse transformer T2 shown in FIG. 5 will now be described with reference to FIGS. 7A to 7D. The multiple transformer is the subject of Japanese patent Application No. 2006-270976.

FIGS. 7A to 7D are representations of the structure of a multiple transformer defined by a combination of a transformer for transmitting power and two pulse transformers for transmitting edge signals.

The pulse transformer used in the first preferred embodiment transmits a pulse edge signal, but not a switching frequency signal, and accordingly, the inductance of the pulse transformer can be as low as, for example, several microhenries. A closed magnetic circuit core can be formed by winding one turn or two turns. The multiple transformer defines a power-transmitting transformer and two pulse transformers. The multiple transformer includes a pair of cores and independent coils provided to the respective cores.

Figure 7A:
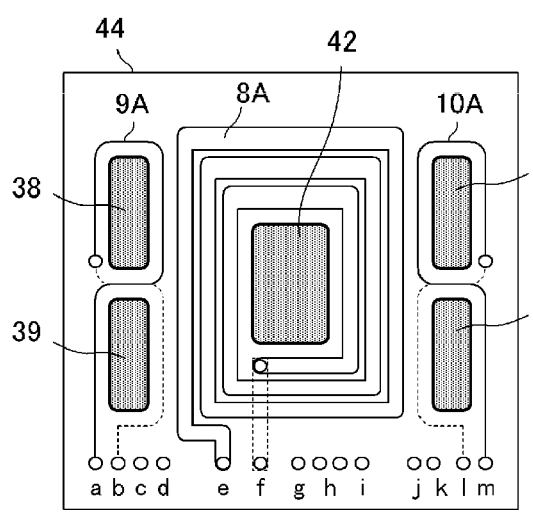
FIGS. 7A to 7D are representations of the structure of a multiple transformer used in the isolated switching power supply device 101.
Figure 7B:
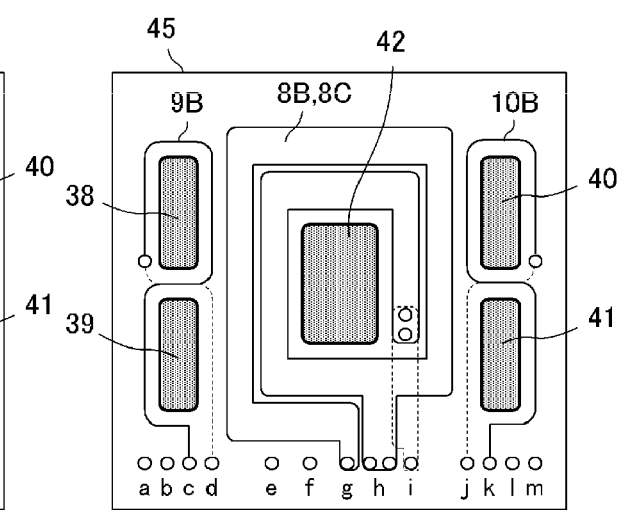
Figure 7C:
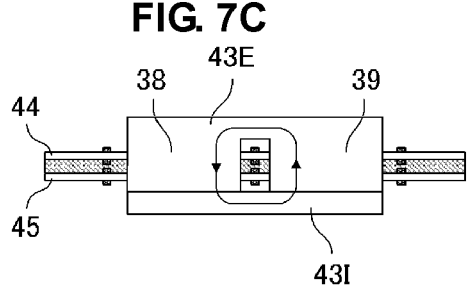
Figure 7D:
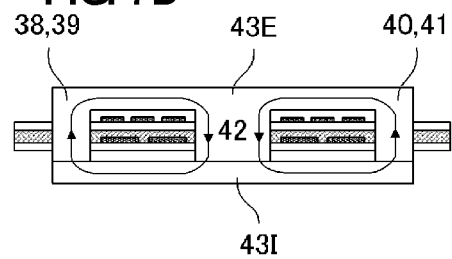

FIGS. 7A and 7B are plan views of the coil patterns disposed on a transformer substrate, and FIGS. 7C and 7D are sectional views of the multiple transformer viewed from specific positions.

In FIGS. 7A to 7D, printed circuit boards 44 and 45 are caught in an E-I core formed by combining an E-shaped core 43E having 5 legs 38, 39, 40, 41 and 42 and an I-shaped core 43I, and are thus engaged with each other to define a closed magnetic circuit. In FIGS. 7A to 7D, the legs 38, 39, 40 and 41 are a first outer leg, a second outer leg, a third outer leg and a fourth outer leg, respectively, and the leg 42 is a center leg. The legs pass through a first to a fourth outer hole and a center hole formed in the respective printed circuit boards 44 and 45.

A printed circuit board unit preferably has a four-layer structure including printed circuit boards 44 and 45 with a prepreg therebetween. The layers of the first printed circuit board 44 define a first and a second layer of the printed circuit board unit, and the layers of the second printed circuit board 45 define a third and a fourth layer of the circuit board unit. Reference letters a to m designate through holes formed in the printed circuit boards 44 and 45. The input and output terminals of the transformers are formed in these through holes. The conductor patterns of the primary coil 8A, secondary coil 8B and tertiary coil 8C of the main transformer 8 are wound around the center leg 42 of the core of the printed circuit boards 44 and 45 in a spiral manner. For example, the primary coil 8A is wound three turns between the input/output terminals e and f of the printed circuit board 44, and the secondary coil 8B and the tertiary coil 8C are each wound one turn between input/out terminals g and i of the printed circuit board 45 with an intermediate tap h therebetween.

The primary coil 9A and the secondary coil 9B of the first pulse transformer 9 each include two coils connected in series. The two coils are wound with the same number of turns around the first outer leg 38 and the second outer leg 39 in the opposite directions. For example, the primary coil 9A is wound one turn between the input/output terminals a and b of the printed circuit board 44, and the secondary coil 9B is wound one turn between the input/output terminals c and d of the printed circuit board 45.

The primary coil 10A and the secondary coil 10B of the second pulse transformer 10 each includes two coils connected in series. The two coils are wound with the same number of turns around the third outer leg 40 and the fourth outer leg 41 in the opposite directions. For example, the primary coil 10A is wound one turn between the input/output terminals l and m of the first printed circuit board 44, and the secondary coil 10B is wound one turn between the input/output terminals j and k of the second printed circuit board 45.

This structure can provide a multiple transformer without degrading the characteristics of the main transformer, and is advantageous in reducing the size and cost.

The isolated switching power supply device 101 shown in FIG. 5 has a single pulse transformer T2. When the multiple transformer is used for the structure shown in FIG. 5, either of the pulse transformers is used.

Figure 1:
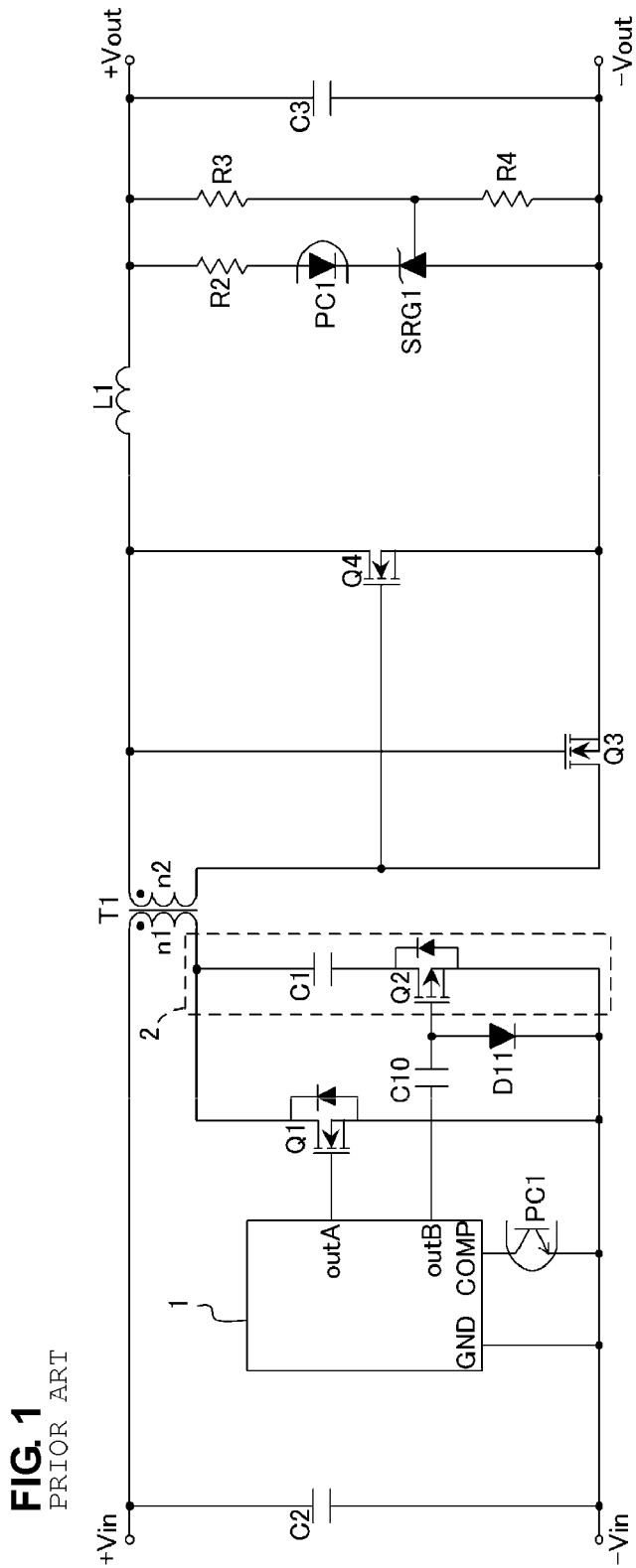
FIG. 1 is a circuit diagram of a known isolated switching power supply device.
Figure 2:
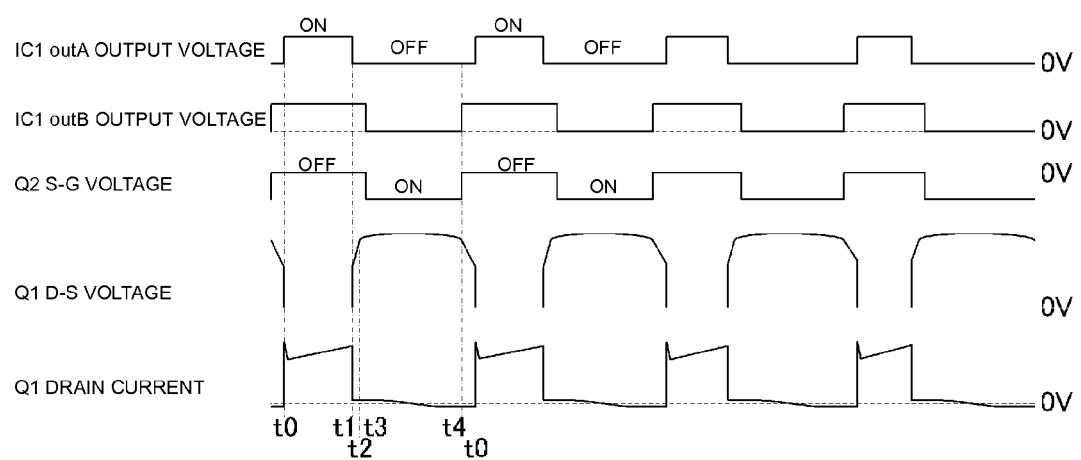
FIG. 2 is a representation of waveforms of some portions of the isolated switching power supply device shown in FIG. 1.
Figure 3:
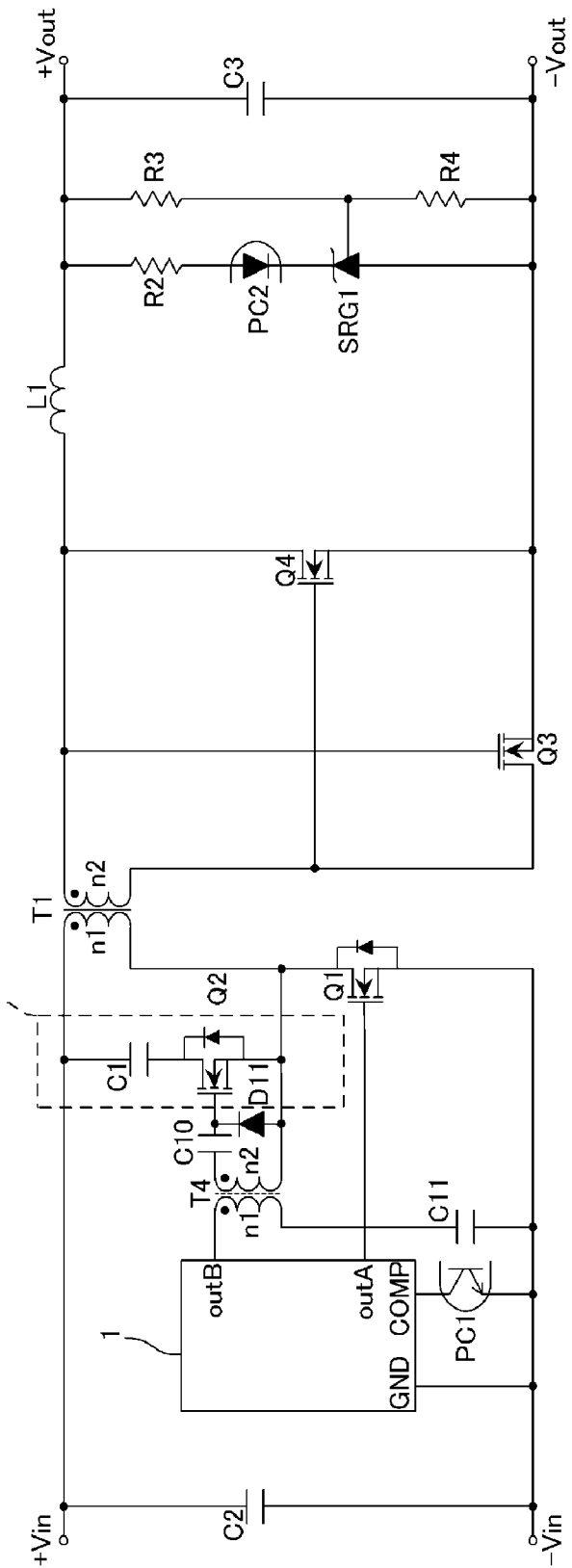
FIG. 3 is a circuit diagram of another known isolated switching power supply device.
Figure 4:
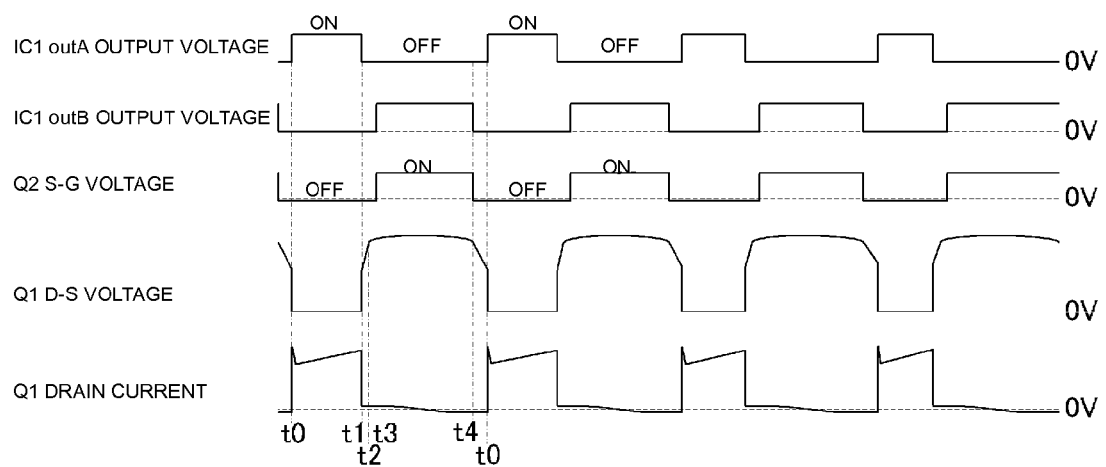
FIG. 4 is a representation of waveform charts of some portions of the isolated switching power supply device shown in FIG. 3.

In the first preferred embodiment, a voltage clamping circuit 2 having different potentials at the ground terminal of the switching control circuit 1 and the reference terminal (source) of the clamp switch Q2 can be provided by use of the pulse transformer T2. The pulse transformer T2 designating an off timing requires a lower excitation inductance (several microhenries) than the known drive transformer T4 used in the known configuration shown in FIG. 3. In the multiple transformer shown in FIGS. 7A to 7D, in particular, the number of turns of the primary coil n1 and the secondary coil n2 of the pulse transformer T2 can be only one turn or two turns. Accordingly, the space for winding can be minimized, and consequently the resulting device can be miniaturized. Furthermore, the use of the multiple transformer can achieve a more inexpensive configuration than the separate use of a power-transmitting main transformer T1 and a pulse transformer T2.

Second Preferred Embodiment

Figure 8:
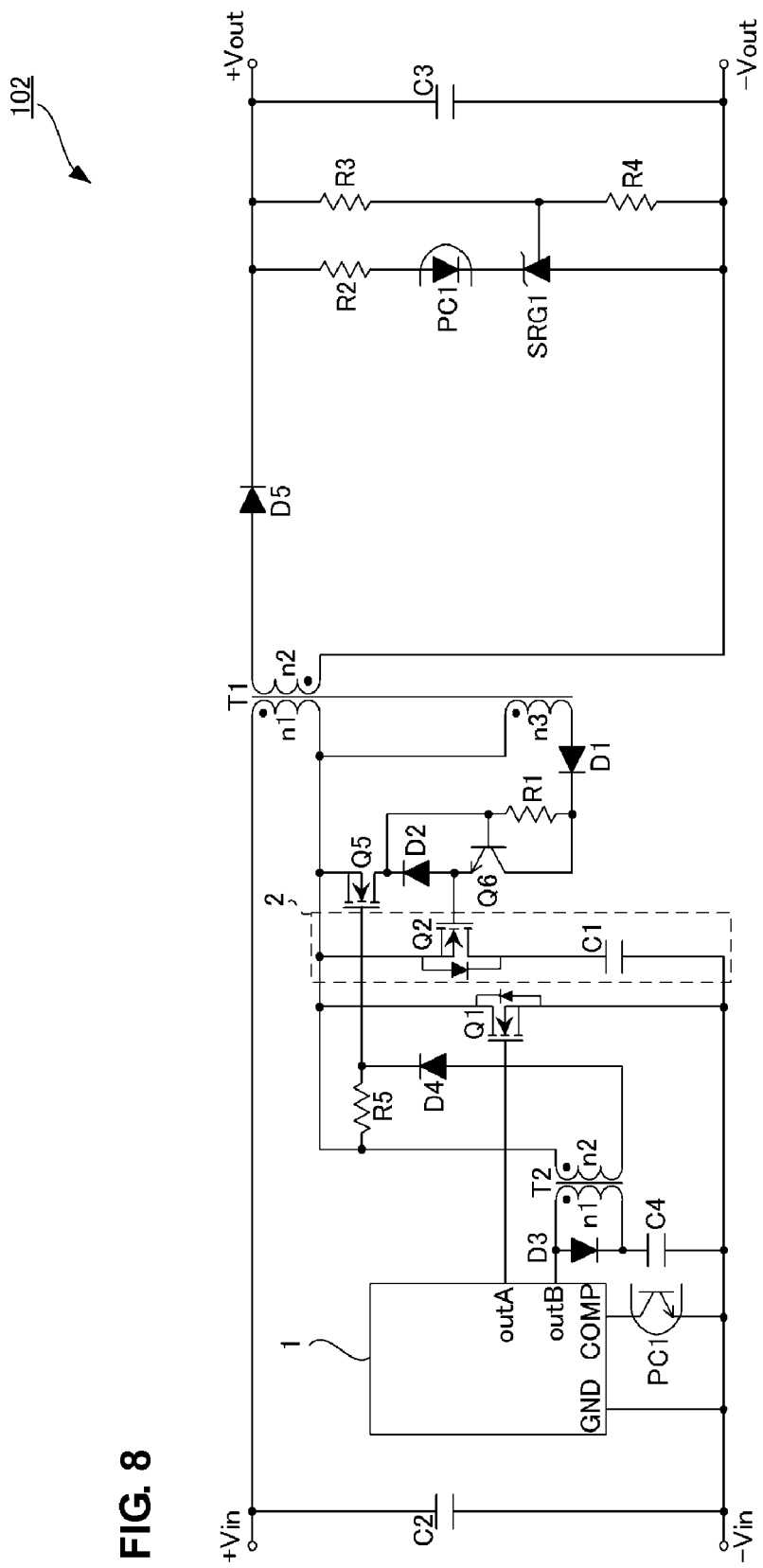
FIG. 8 is a circuit diagram of an isolated switching power supply device 102 according to a second preferred embodiment of the present invention.
Figure 9:
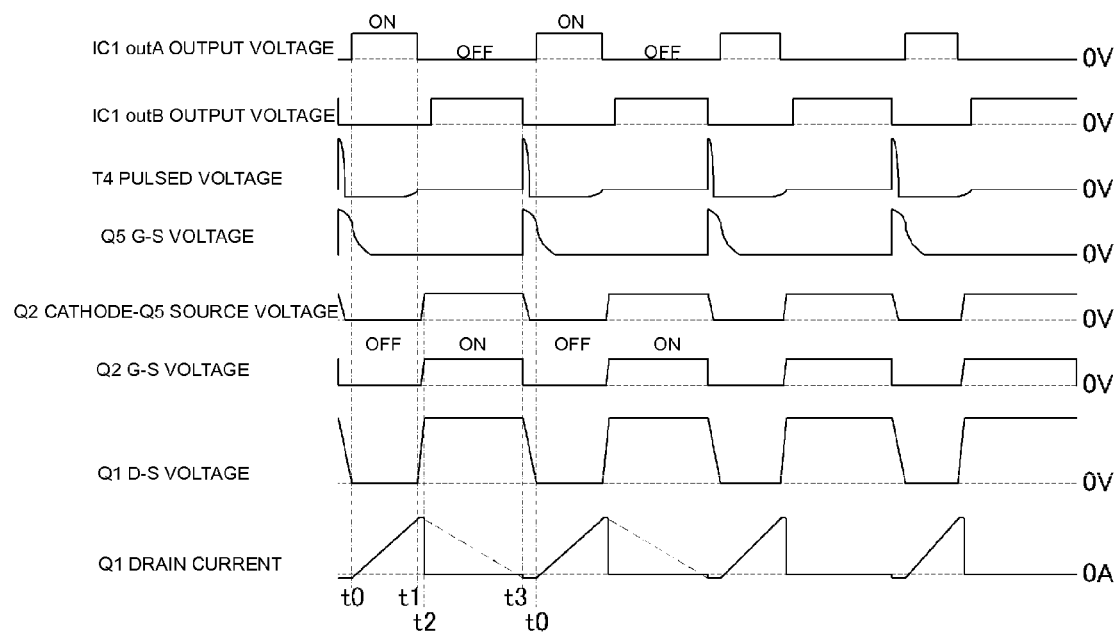
FIG. 9 is a representation of waveform charts of some portions of the isolated switching power supply device 102 shown in FIG. 8.

FIG. 8 is a circuit diagram of an isolated switching power supply device 102 according to a second preferred embodiment of the present invention. FIG. 9 shows waveforms of some portions of the isolated switching power supply device 102.

Subsequently, the same configuration as that in the first preferred embodiment shown in FIG. 5 is provided on the primary side of the main transformer T1. On the secondary side of the main transformer T1 are disposed a rectifying diode D5, an output smoothing capacitor C3, resistors R2, R3 and R4, an ELD of the photo coupler PC1, and a shunt regulator SRG1.

The isolated switching power supply device 102 of the second preferred embodiment acts as an active clamp flyback converter. The configuration of the clamp switch driving circuit and the feedback operation of output voltages are the same as in the first preferred embodiment, and how the power is converted will now be described.

A DC voltage applied between the terminals +Vin and −Vin of the DC input power supply is smoothed by an input smoothing capacitor C2, and subsequently switched by a power switch Q1 and thus converted into an AC voltage. Electromagnetic energy stored in the excitation inductance of the main transformer T1 in a period for which the power switch Q1 is on is output to the secondary circuit through the rectifying diode D5 in a period for which the power switch Q1 is off. The voltage rectified in the rectifying diode D5 is smoothed by the output smoothing capacitor C3, and thus converted into a DC voltage.

As shown in FIG. 9, when the output from the terminal outA changes to the H level from the L level at time t0, the power switch Q1 is turned on. The drain current of the power switch Q1 increases directly according to the gradient (Vin/Lm) of the input voltage Vin and the excitation inductance Lm of the main transformer T1. When the power switch Q1 is turned off at time t1, LC resonance occurs between the excitation inductance of the transformer T1 and the parasitic capacitance present parallel to the D-S portion of the power switch Q1 (between times t1 to t2). If the D-S voltage of the power switch Q1 increases beyond the voltage between the ends of the clamp capacitor C1 at time t2, the parasitic diode of the clamp switch Q2 is brought into conduction and LC resonance occurs between the excitation inductance of the transformer T1 and the capacitance of the clamp capacitor C1. Since the relationship Vout≈(n2/n1)·Vc1 holds among the output voltage Vout, the voltage Vc1 between both ends of the clamp capacitor C1 and the turn ratio n2/n1 of the main transformer T1, the parasitic diode of the clamp switch Q2 is brought into conduction and, concurrently, the rectifying diode D5 is brought into conduction to supply power to the secondary circuit. Although the exciting current of the main transformer T1 is divided to flow to the clamp switch Q2 and the rectifying diode D5 in the period for which the D-S voltage of the power switch Q1 is clamped at substantially a constant value, the sum of the exciting current is reduced directly, as indicated by a dashed line of (h) shown in FIG. 9. When the output voltage from the terminal outB of the switching control circuit 1 reversed to the low level from the high level at time t3, the charge stored in the capacitor C4 is discharged to the terminal outB through the primary coil n1 of the pulse transformer T2. Consequently, a pulsed voltage is generated in the pulse transformer T2, thereby turning off the clamp switch Q2. If both the clamp switch Q2 and the rectifying diode D5 are turned off, the resonance capacitance of the LC resonance circuit becomes the parasitic capacitance parallel to the D-S portion of the power switch Q1 again. The resonance capacitance is thus reduced to reduce the D-S voltage rapidly. The D-S voltage of the power switch Q1 is reduced to zero volts by the resonance of the LC resonance circuit, and then the power switch Q1 is turned again at time t0 in the following cycle.

The cycle above is repeated.

Surge voltage at both ends of the power switch Q1 is prevented by clamping operation. Accordingly, a low-withstand-voltage transistor can be used as the power switch Q1. In addition, zero voltage switching by the power switch Q1 and the clamp switch Q2 is effective in enhancing the efficiency and reducing noises.

The multiple transformer shown in FIGS. 7A to 7D can be used as the main transformer T1 and the pulse transformer T2 of the isolated switching power supply device of the second preferred embodiment.

Third Preferred Embodiment

Figure 10:
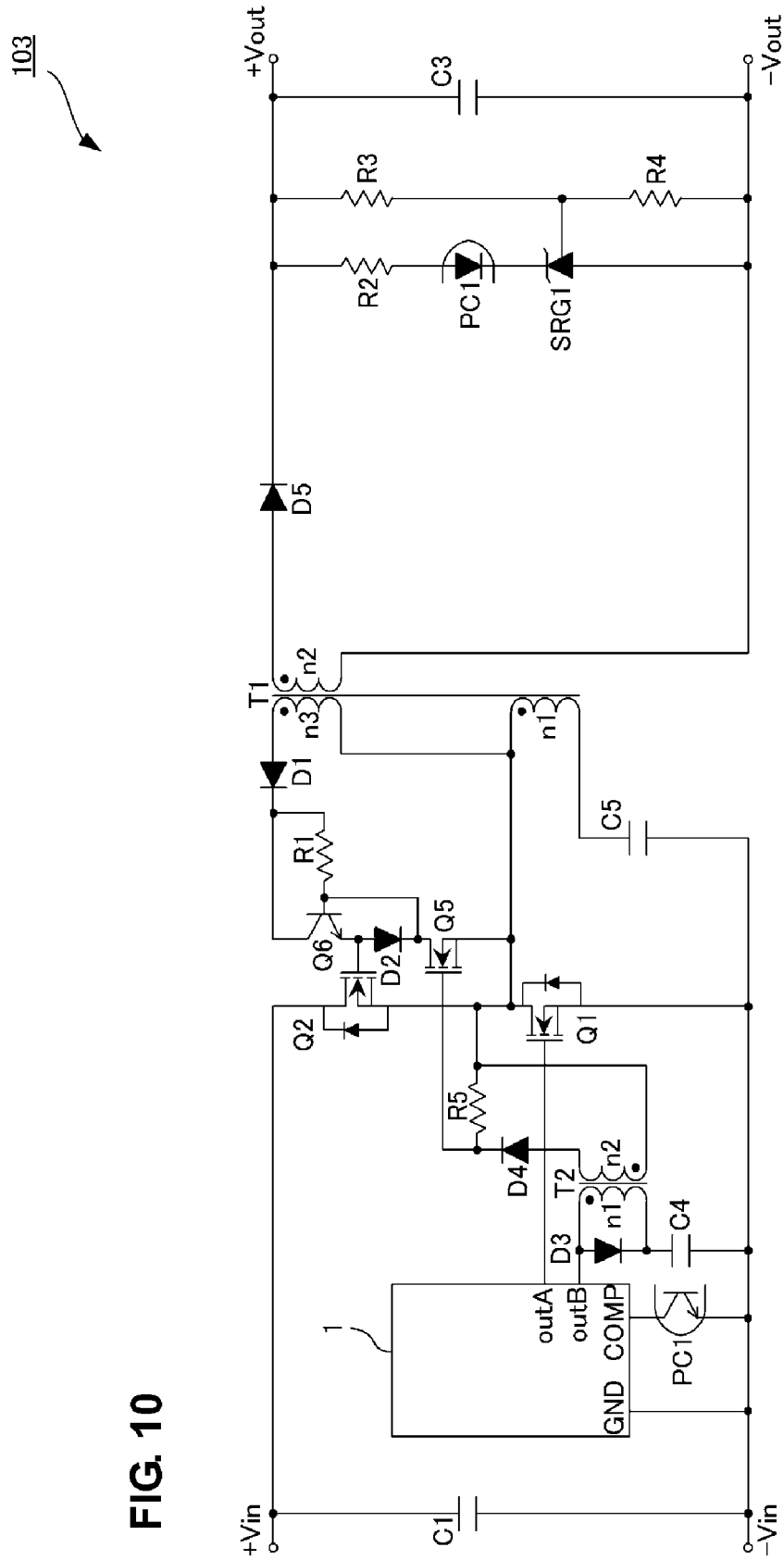
FIG. 10 is a circuit diagram of an isolated switching power supply device 103 according to a third preferred embodiment of the present invention.
Figure 11:
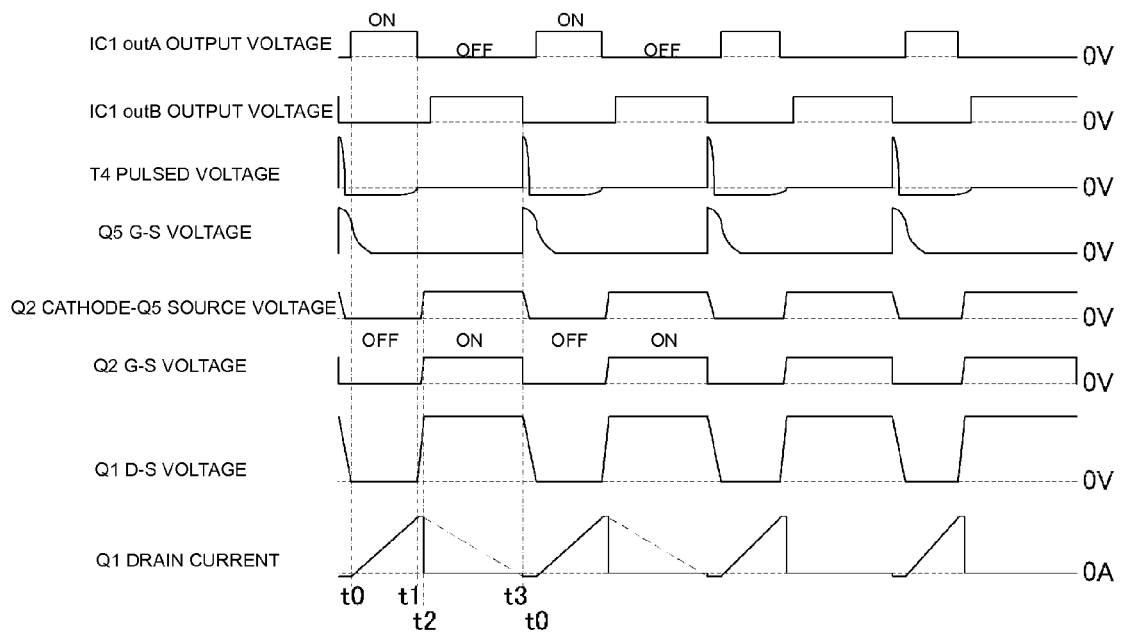
FIG. 11 is a representation of waveform charts of some portions of the isolated switching power supply device 103 shown in FIG. 10.

FIG. 10 is a circuit diagram of an isolated switching power supply device 103 according to a third preferred embodiment of the present invention. FIG. 11 shows waveforms of some portions of the isolated switching power supply device 103. The isolated switching power supply device 103 of the third preferred embodiment acts as an asymmetrical control half bridge converter. The asymmetrical control refers to a controlling technique for controlling the driving of the power switch Q1 and the clamp switch Q2 with complementary timing with dead time periods for which both switches are off. Thus, PWM control is performed such that when the pulse width of the power switch Q1 is increased, the pulse width of the clamp switch Q2 is reduced, and when the pulse width of the power switch Q1 is reduced, the pulse width of the clamp switch Q2 is increased. As shown in FIG. 11, the waveform in operation is similar to that of the active clamp flyback converter of the second preferred embodiment.

In FIG. 10, substantially the same configuration as that in the second preferred embodiment shown in FIG. 8 is provided on the secondary side of the main transformer T1. The clamp capacitor C1 disposed on the primary side of the main transformer T1 doubles as an input smoothing capacitor. A series circuit including a clamp capacitor C1 and a clamp switch Q2 is connected to the primary coil n1 of the main transformer in series to define a voltage clamping circuit. A capacitor C5 is connected to the primary coil n1 of the main transformer T1, and the primary coil n1 of the main transformer T1, the capacitor C5 and the power switch Q1 define a closed loop.

In general, asymmetrical control half bridge converters may not be categorized as the voltage clamping circuit. However, the operation of the asymmetrical control half bridge converter that clamps voltage between both ends of the power switch Q1 by switching the resonance capacitance of the LC resonance halfway is the same as in the voltage clamping circuits of the first and the second preferred embodiment. The isolated switching power supply device 103 of the third preferred embodiment can therefore be considered to be a version of the isolated switching power supply device according to the present invention.

The switching control circuit 1 is a PWM control IC capable of driving an active clamp converter, and includes a power switch driving terminal outA, a clamp switch driving terminal outB, a feedback signal input terminal COMP and a ground terminal GND.

The clamp switch Q2 is an n-type channel MOSFET, and has a parasitic diode in parallel. The configuration of the clamp switch driving circuit and the feedback operation of output voltages are the same as in the first and second preferred embodiments, and how the power is converted will now be described.

A DC voltage applied between the terminals +Vin and −Vin of the DC input power supply is first smoothed by a clamp capacitor C1. Subsequently, the smoothed voltage is switched by the power switch Q1 and the clamp switch Q2 that operate with complementary timing, and converted into AC voltage. The voltage Vc5 charging the capacitor C5 is higher than zero volts and lower than the voltage (input voltage) Vc1 between both ends of the clamp capacitor C1, and varies according to the duty of the power switch Q1. The rectifying diode D5 is brought into conduction in a period for which the power switch Q1 is off, by the electromagnetic energy stored in the excitation inductance of the main transformer T1 in a period for which the power switch Q1 is on and the difference (Vc1−Vc5) between the voltages Vc1 and Vc5. The voltage rectified in the rectifying diode D5 is smoothed by the output smoothing capacitor C3, and thus converted into a DC voltage.

As shown in FIG. 11, when the output from the terminal outA changes to the H level from the L level at time t0, the power switch Q1 is turned on. The drain current of the power switch Q1 increases directly according to the gradient (Vc5/Lm) of the voltage Vc5 between both ends of the capacitor C5 and the excitation inductance Lm of the main transformer T1. When the power switch Q1 is turned off at time t1, LC resonance occurs between the excitation inductance of the transformer T1 and the parasitic capacitance present parallel to the D-S portion of the power switch Q1 (between times t1 to t2). If the D-S voltage of the power switch Q1 increases beyond the voltage between the ends of the clamp capacitor C1 at time t2, the parasitic diode of the clamp switch Q2 is brought into conduction and LC resonance occurs between the excitation inductance of the transformer T1 and the capacitance of the clamp capacitor C1. Since the relationship: Vout≈(n2/n1)·(Vc1−Vc5) holds among the output voltage Vout, the turn ratio n2/n1 of the main transformer T1, and the voltages Vc1 and Vc5 between both ends of the capacitors C1 and C5, the parasitic diode of the clamp switch Q2 is brought into conduction and, concurrently, the rectifying diode D5 is brought into conduction to supply power to the secondary circuit. Although the exciting current of the main transformer T1 is divided to flow to the clamp switch Q2 and the rectifying diode D5 in the period for which the D-S voltage of the power switch Q1 is clamped at substantially a constant value, the sum of the exciting current of the main transformer T1 is reduced directly, as indicated by a dashed line of (h) shown in FIG. 11. When the output voltage from the terminal outB of the switching control circuit 1 is reversed to the low level from the high level at time t3, the charge stored in the capacitor C4 is discharged to the terminal outB through the primary coil n1 of the pulse transformer T2. Consequently, a pulsed voltage is generated in the secondary coil n2 of the pulse transformer T2, thereby turning off the clamp switch Q2. If both the clamp switch Q2 and the rectifying diode D5 are turned off, the resonance capacitance of the LC resonance circuit becomes the parasitic capacitance parallel to the D-S portion of the power switch Q1 again. The resonance capacitance is thus reduced to reduce the D-S voltage rapidly. The D-S voltage of the power switch Q1 is reduced to zero volts by the resonance of the LC resonance circuit, and then the power switch Q1 is turned on again at time t0 in the following cycle.

The cycle above is repeated.

The above-described clamping operation prevents a surge voltage beyond the input voltage Vc1 from being applied to the power switch Q1. Similarly, when a surge voltage beyond the input voltage Vc1 is about to be applied to the clamp switch Q2, the parasitic diode of the power switch Q1 is brought into conduction, and clamped to the input voltage Vc1. Consequently, low-withstand-voltage transistors can be used as the power switch Q1 and the clamp switch Q2 respectively. In addition, zero voltage switching by the power switch Q1 and the clamp switch Q2 is effective in enhancing the efficiency and reducing noises.

The multiple transformer shown in FIGS. 7A to 7D can be used as the main transformer T1 and the pulse transformer T2 of the isolated switching power supply device of the third preferred embodiment.

Fourth Preferred Embodiment

Figure 12:
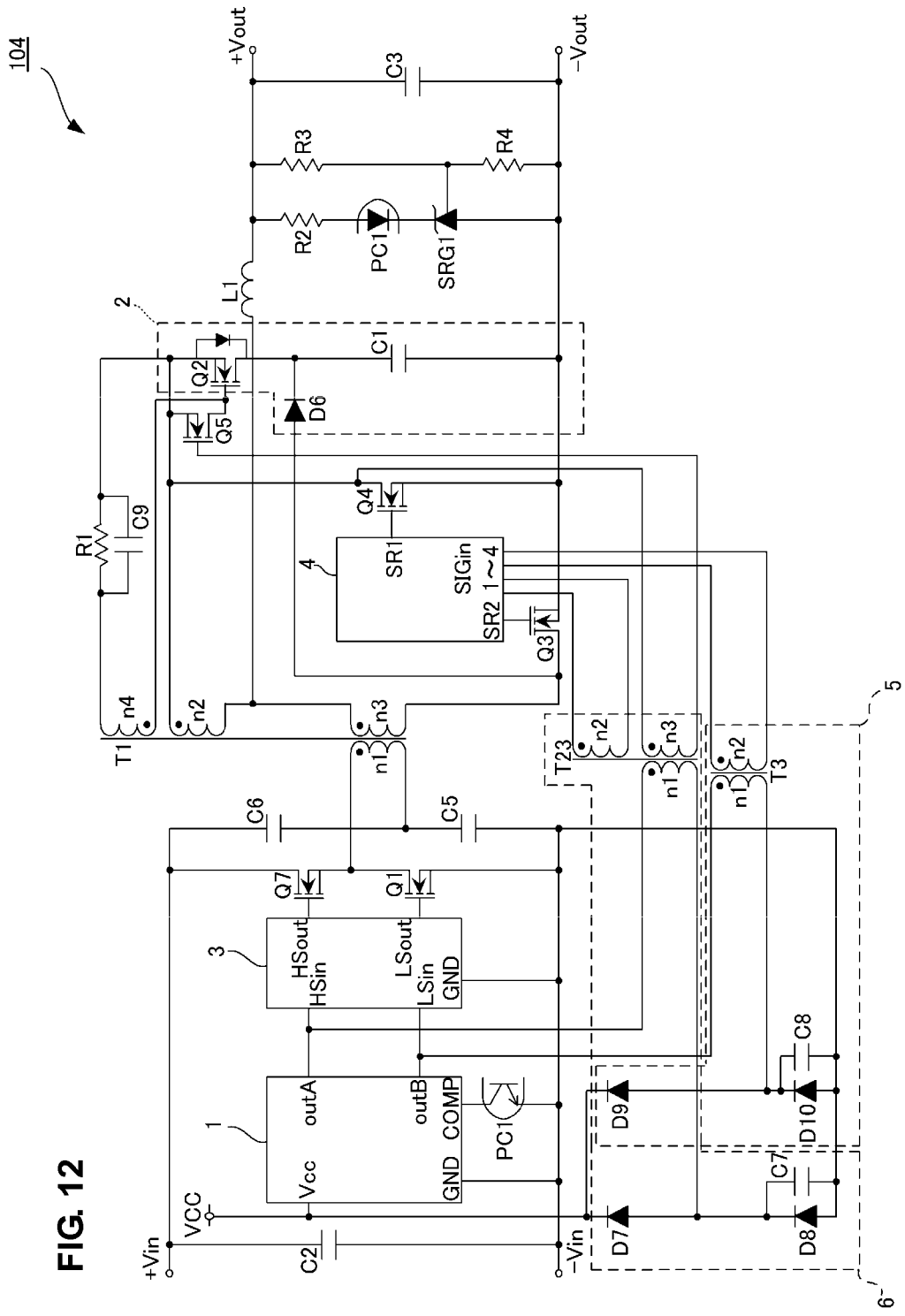
FIG. 12 is a circuit diagram of an isolated switching power supply device 104 according to a fourth preferred embodiment of the present invention.
Figure 13:
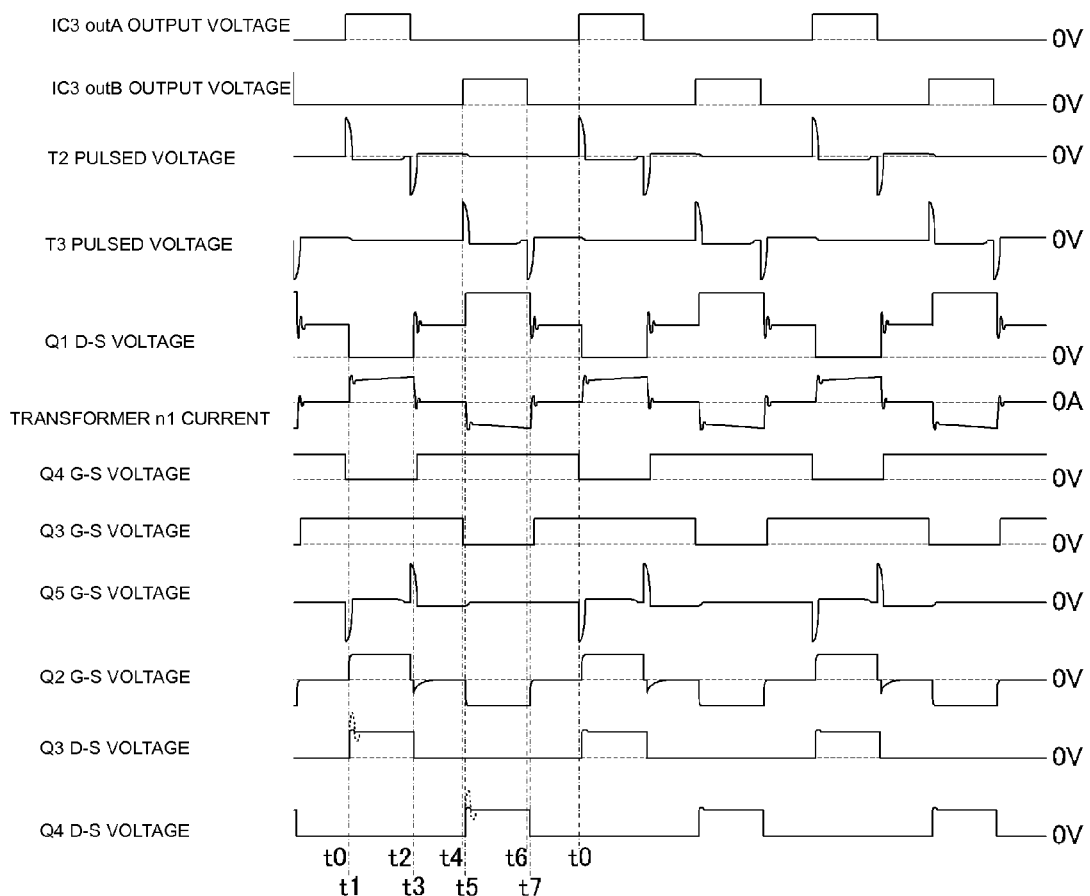
FIG. 13 is a representation of waveform charts of some portions of the isolated switching power supply device 104 shown in FIG. 12.

FIG. 12 is a circuit diagram of an isolated switching power supply device 104 according to a fourth preferred embodiment of the present invention. FIG. 13 shows waveforms of some portions of the isolated switching power supply device 104. The isolated switching power supply device 104 of the fourth preferred embodiment acts as a symmetrical control half bridge converter. The symmetrical control refers to a controlling technique for controlling the driving of a first power switch Q1 and a second power switch Q7 with substantially the same pulse width with dead time periods for which both switches are off. PWM control is thus performed such that when the pulse width of the first power switch Q1 is increased, the pulse width of the second power switch is also included, and when the pulse width of the first power switch is reduced, the pulse width of the second power switch is also reduced. In the isolated switching power supply device 104 of the fourth preferred embodiment, the voltage clamping circuit can protect the synchronous rectifying devices Q3 and Q4 by clamping spike voltages generated at both ends of the synchronous rectifying devices Q3 and Q4 due to leakage inductance from the main transformer T1 to a predetermined value or less. By regenerating an energy once absorbed by a clamp capacitor C1, low-loss circuit operation can be achieved.

In the isolated switching power supply device 104 shown in FIG. 12, on the primary side of the main transformer T1 are disposed an input smoothing capacitor C2, a switching control circuit 1, a high-side driver 3, a low-side power switch Q1, a high-side power switch Q7, capacitors C5 and C6, a diode bridge including diodes D7, D8, D9 and D10, and capacitors C7 and C8.

The low-side power switch Q1, the high-side power switch Q7, the capacitors C5 and C6, the primary coil n1 of the main transformer T1, and the high-side driver 3 constitute a symmetrical control half bridge converter.

The main transformer T1 includes a primary coil n1, a secondary coil n2, a tertiary coil n3 and a quaternary coil n4. The secondary coil n2 and the tertiary coil n3 generally have the same number of turns.

On the secondary side of the main transformer T1 are disposed synchronous rectifying devices Q3 and Q4, a choke coil L1, an output smoothing capacitor C3, resistors R2, R3 and R4, an ELD of the photo coupler PC1, and a shunt regulator SRG1. A voltage clamping circuit 2 including a clamp capacitor C1, a clamp switch Q2 and a diode D6 is also disposed on the secondary side of the main transformer T1. More specifically, the voltage clamping circuit 2 is connected in parallel to the series circuit including the secondary coil n2 and the tertiary coil n3 of the main transformer T1. In addition, a resistor R1, a capacitor C9 and a switch element Q5 are disposed on the secondary side of the main transformer T1.

The clamp switch Q2 is an n-type channel MOSFET, and has a parasitic diode in parallel.

The switching control circuit 1 shown in FIG. 12 is a PWM control IC capable of driving a bridge converter. The switching control circuit 1 includes a power switch driving terminal outA, a clamp switch driving terminal outB, a feedback signal input terminal COMP and a ground terminal GND.

The high-side driver 3 includes a low-side driving signal input terminal LSin, a high-side driving signal input terminal HSin, a low-side switch driving terminal LSout, a high-side switch driving terminal HSout and a ground terminal GND.

The high-side driver 3 amplifies the output voltage from the power switch driving terminal outA of the switching control circuit 1, and the source terminal of the high-side power switch Q7 outputs a high-side switch driving signal varying in an alternating manner with respect to the ground potential of the primary circuit.

A first and second doubling pulse transformer T23 includes a primary coil n1, a secondary coil n2 and a tertiary coil n3. A third pulse transformer T3 includes a primary coil n1 and a secondary coil n2.

The quaternary coil n4 of the main transformer T1, the switch element Q5, the capacitor C9 and the resistor R1 constitute a clamp switch driving circuit.

The third pulse transformer T3, the capacitor C8 and schottky-barrier diodes D9 and D10 constitute a first edge signal-generating circuit 5 that is arranged to generate a pulsed signal produced by differentiating the output from the terminal outB of the switching control circuit 1. The first and second doubling transformer T23, the capacitor C7 and schottky-barrier diodes D7 and D8 constitute a second edge signal-generating circuit 6 that is arranged to generate a pulsed signal produced by differentiating the output from the terminal outA of the switching control circuit 1. As shown in FIG.

12, a controlled source voltage VCC is applied to the first edge signal-generating circuit 5 and the second edge signal-generating circuit 6.

The synchronous rectifying device-driving circuit 4 includes pulsed signal input terminals SIGin1 to SIGin4, a first synchronous rectifying device-driving terminal SR1, and a second synchronous rectifying device-driving terminal SR2.

The third pulse transformer T3 transmits a first turn-off edge signal and a first turn-on edge signal to the secondary side. The first and second doubling transformer T23 transmits a second turn-off edge signal and a second turn-on edge signal to the secondary side. The rectifying side switching device Q3 is turned off by the first turn-off edge signal transmitted by the third pulse transformer T3 (at time t3 in FIG. 13 described below), and the commutation side switching device Q4 is turned on by the first turn-on edge signal transmitted by the third pulse transformer T3 (at time t5 in FIG. 13). The commutation side switching device Q4 is turned off by the second turn-off edge signal transmitted by the first and second doubling pulse transformer T23 (at time t7 in FIG. 13), and the rectifying side switching device Q3 is turned on by the second turn-on edge signal transmitted by the first and second doubling pulse transformer T23 (at time t1 in FIG. 13).

The two pulse transformers in the above configuration transmit edge signals to drive the synchronous rectifying device of the symmetrical control half bridge converter.

Power is converted in the following manner.

The DC voltage applied between the terminals +Vin and −Vin of a DC input power supply is first smoothed by an input smoothing capacitor C2, subsequently converted into an AC voltage by switching of the first power switch Q1 and the second power switch, and then transmitted from the primary coil n1 of the main transformer T1 to the secondary coil n2 and the tertiary coil n3. The AC voltage is rectified by the symmetrical rectifying device Q3, and is then converted into a direct voltage by being smoothed through the choke coil L1 and the output smoothing capacitor C3.

Since the first power switch Q1 and the second power switch Q7 have substantially the same pulse width in the on-state, the voltage between the connection point of the capacitors C5 and C6 and the ground is reduced to about a half of the voltage of the input power supply. The output voltage Vout is expressed by:

$$V\text{out} \approx \{n2/(2 \cdot n1)\} \cdot D \cdot V\text{in}$$

wherein Vin represents input power supply voltage, D represents the on-duty of the power switches Q1 and Q7, and n2/n1 represents the turn ratio of the main transformer T1.

When signals are alternately output from the terminals outA and outB of the switching control circuit 1, as shown in (a) and (b) of FIG. 13, pulsed signals shown in (c) and (d) are formed in the pulse transformers T23 and T3 and transmitted from the primary circuit to the secondary circuit. The synchronous rectifying device-driving circuit 4 receives the pulsed signals, and almost reverses the signal from the terminal outA and the signal from the terminal outB to form a commutation side switching device Q4 driving signal and a rectifying side switching device Q3 driving signal, respectively. The synchronous rectifying device-driving circuit 4 produces a dead time period for which the power switches Q1 and Q7 and the synchronous rectifying devices Q3 and Q4 are off together, in view of the fact that there is a delay time between when the pulsed signals formed by reversing the output signals from the terminals outA and outB from the H level to the L level are received and when the gates of the synchronous rectifying devices Q3 and Q4 are charged.

When the signals from the terminals outA and outB are reversed from the L level to the H level, a dead time period is produced using the delay (times t0, t1, t4 and t5) of transmission between the input and the output of the high-side driver 3. When the power switches Q1 and Q7 are alternately turned on by driving signals outputted from the high-side switch driving terminal HSout and the low-side switch driving terminal LSout of the high-side driver 3 with reference to the signals from the terminals outA and outB, a current proportional to the current flowing to the choke coil L1 flows to the primary coil n1 of the main transformer T1, as shown in (f) of FIG. 13. The secondary coil n2 is brought into conduction in the period for which the power switch Q1 is on, and the tertiary coil n3 is brought into conduction in the period for which the power switch Q7 is on. The output current is divided to flow into the secondary coil n2 and the tertiary coil n3 in the period for which both the power switches Q1 and Q7 are off.

When the power switches Q7 and Q1 are turned off at times t3 and t7, the current in the tertiary coil n3 and the secondary coil n2 is switched, but tends to continue to flow by the leakage inductance of the main transformer T1. If there is no voltage clamping circuit, accordingly, spike voltages indicated by dashed lines are generated in the waveforms of (k) and (l) shown in FIG. 13. In contrast, if the voltage clamping circuit is provided, the parasitic diode of the clamp switch Q2 or the diode D6 is brought into conduction to clamp the D-S voltages of the synchronous rectifying devices Q3 and Q4 to the voltage between both ends of the clamp capacitor C1.

The output voltage from the quaternary coil n4 of the main transformer T1 is applied between the gate and the source of the clamp switch Q2 through the capacitor C9 and the resistor R1. When the power switch Q7 is turned on, the clamp switch Q2 is thus turned on. In the period for which the clamp switch Q2 is on, the excess of the electrostatic energy (charge) stored in the clamp capacitor C1 is regenerated as the output from the converter through the clamp switch Q2 and the secondary coil n2 of the transformer T1.

When the switch element Q5 is turned on at time t2 by a pulsed signal applied between the gate and the drain of the switch element Q5, the charge stored in the gate of the clamp switch Q2 is discharged and the clamp switch is turned off. The power switch Q1 is turned on at time t5 through a delay time of the high-side driver. If the timing with which the clamp switch Q2 is tuned off is delayed, a short-circuit current flows due to the charge stored in the clamp capacitor C1 to produce a large loss. The circuit shown in FIG. 12 prevents the short circuit current according to the above-described operation.

As described above, the voltage clamping circuit 2 allows the use of low-withstand-voltage MOSFETs as the synchronous rectifying devices Q3 and Q4, and a high-efficient circuit operation can be achieved by regenerating an absorbed electromagnetic energy. The circuit shown in FIG. 12 has another feature in which a single voltage clamping circuit 2 absorbs surge voltages of the synchronous rectifying devices Q3 and Q4.

A multiple transformer having substantially the same configuration as shown in FIGS. 7A to 7D may be used as the main transformer T1, the first and second doubling pulse transformer T23 and the third pulse transformer T3 shown in FIG. 12. More specifically, a printed coil corresponding to the secondary coil n2, the tertiary coil n3 and the quaternary coil n4 of the main transformer T1 shown in FIG. 12 is provided in a layer different from the layer in which a printed coil corresponding to the primary coil n1 is provided. Two outer legs and printed coils define the first and second doubling pulse transformer T23 and the third pulse transformer T3. The secondary coil n2 and the tertiary coil n3 of the first and second doubling pulse transformer T23 can be provided in different layers from each other.

In the preferred embodiment shown in FIG. 12, the control circuit on the primary side drives the voltage clamping circuit 2 on the secondary side. A withstand voltage required for safety standards can be ensured by a configuration in which the primary coils and the secondary coils of the first and second doubling pulse transformer T23 and the third pulse transformer T3 are provided in different layers separated by a prepreg in a printed circuit board.

Although the preferred embodiment shown in FIG. 12 uses the first and second doubling pulse transformer T23, a first pulse transformer and a second pulse transformer respectively having a primary coil and a secondary coil may be used.

While the present invention has been described with reference to exemplary preferred embodiments, it is to be understood that the present invention is not limited to the disclosed exemplary preferred embodiments, and various modifications may be made. For example, various topologies may be used for the circuit configuration of a power-converting portion. Although the above preferred embodiments use changes in voltage of the main transformer T1 as a trigger to charge the gate of the clamp switch to turn on the clamp switch, a pulsed signal transmitted by the pulse transformer may be used as the trigger to turn on the clamp switch.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An isolated switching power supply device having a primary circuit side and a secondary circuit side, comprising:
   a main transformer including a primary coil located on the primary circuit side and a secondary coil located on the secondary circuit side so as to transmit power from the primary circuit side to the secondary circuit side;
   at least one power switch connected to the primary coil of the main transformer in series and arranged to switch a current flowing to the primary coil of the main transformer from a DC input power supply;
   a rectifier circuit arranged to rectify the voltage generated in the secondary coil of the main transformer;
   a smoothing circuit arranged to smooth the voltage rectified by the rectifier circuit;
   a voltage clamping circuit including a clamp switch and arranged to absorb a surge voltage generated when the voltage applied to the main transformer is reversed, and thus clamping the voltage applied to the main transformer to a predetermined upper limit value;
   a switching control circuit including a first output terminal arranged to output a signal to drive the power switch and a second output terminal arranged to output a signal for driving the clamp switch;
   a first pulse transformer including a primary coil connected to the second output terminal and a secondary coil, the first pulse transformer arranged to transmit an edge signal of a pulsed signal for driving the clamp switch; and
   a clamp switch driving circuit connected to the secondary coil of the first pulse transformer and arranged to generate a clamp switch driving signal using the edge of the signal to drive the clamp switch outputted from the first pulse transformer as a trigger, the clamp switch driving signal arranged to control the on/off states of the clamp switch.

2. The isolated switching power supply device according to claim 1, wherein the voltage clamping circuit and the clamp switch driving circuit are disposed on the primary circuit side.

3. The isolated switching power supply device according to claim 2, wherein the voltage clamping circuit and the clamp switch driving circuit are disposed on the secondary circuit side.

4. The isolated switching power supply device according to claim 1, wherein the power switch and the clamp switch are connected to the DC input power supply in series, the primary coil of the main transformer defines a series circuit with a clamp capacitor and the series circuit is connected to a contact point between one end of the power switch and the voltage clamping circuit, and wherein the main transformer, the power switch, the clamp capacitor and the clamp switch define a half bridge circuit.

5. The isolated switching power supply device according to claim 1, wherein the main transformer and the first pulse transformer are defined by a multiple transformer including a core having a center leg and at least one pair of outer legs opposing each other with the center leg therebetween, at least one of the pair of the outer legs being divided into two portions by a space allowing coils to be provided, the core thus defining a closed magnetic circuit; a first coil set including at least two coils wound around the center leg of the core; and a second coil set including at least two coils, each wound around the divided portions of the outer leg in the opposite directions.

6. The isolated switching power supply device according to claim 1, wherein the rectifier circuit is a synchronous rectifier circuit including a first semiconductor switch element and a second semiconductor switch element.

7. The isolated switching power supply device according to claim 6, further comprising a synchronous rectifying device-driving circuit that controls the on/off operation of the first and second semiconductor switch elements of the synchronous rectifier circuit; and a second pulse transformer and a third pulse transformer, each including a primary coil and a secondary coil and transmitting an edge signal of pulse waves, wherein the primary coil of the second pulse transformer is connected to the second output terminal of the switching control circuit, and the secondary coil of the second pulse transformer is connected to the synchronous rectifying device-driving circuit so as to control one of the first and second semiconductor switch of the synchronous rectifier circuit, and wherein the primary coil of the third pulse transformer is connected to the first output terminal of the switching control circuit, and the secondary coil of the third pulse transformer is connected to the synchronous rectifying device-driving circuit so as to control the other semiconductor switch.

8. The isolated switching power supply device according to claim 7, wherein the voltage clamping circuit and the clamp switch driving circuit are disposed in the secondary circuit side, the primary coil of the first pulse transformer and the primary coil of the second pulse transformer include a common winding, and the first pulse transformer and the second pulse transformer are defined by a pulse transformer including a single closed magnetic circuit.

9. The isolated switching power supply device according to claim 8, wherein the main transformer and the first to third pulse transformers are defined by a multiple transformer including a core having a center leg and at least one pair of outer legs opposing each other with the center leg therebetween, at least one of the pair of the outer legs being divided into two portions by a space allowing coils to be provided, the core thus defining a closed magnetic circuit; a first coil set including at least two coils wound around the center leg of the core; and a second coil set including at least two coils, each wound around the divided portions of the outer leg in the opposite directions.

* * * * *